United States Patent Office 2,845,893
Patented Aug. 5, 1958

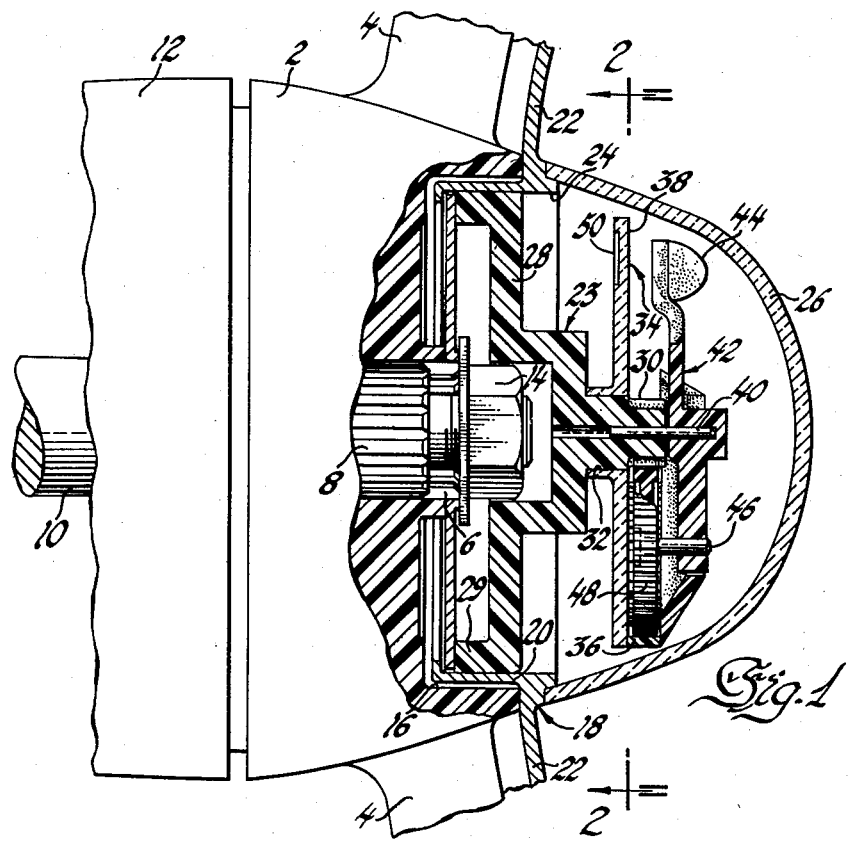

2,845,893

STEERING DIRECTION INDICATOR

Jesse E. Eshbaugh, Thomas W. Lamar, and Werner F. Schultz, Flint, Mich., assignors to General Motors Corporation, Detroit, Mich., a corporation of Delaware Application June 18, 1956, Serial No. 592,170

4 Claims. (Cl. 116—31)

This invention relates to vehicle steering mechanisms and more particularly to steering wheel responsive devices providing visual indication of the angular position of the steerable vehicle wheels.

It has been proposed in the past to mount steerable wheel direction indicating devices on or adjacent the vehicle steering wheel. However, heretofore, installation of such mechanisms has required very substantial modification of the steering wheel assembly in order to accommodate the required mechanism. In addition, previously known mechanisms have been so constructed as to require installation as an original part of the steering wheel assembly.

It is an object of the present invention to provide an improved steerable wheel direction indicating device.

Another object is to provide an indicating device of the stated character which is adapted for disposition in the steering wheel hub or parts associated therewith.

A further object is to provide a steerable wheel direction indicating device of the type referred to which may be installed either as original equipment or at any time subsequently without requiring modification of the normal steering wheel construction.

Yet another object is to provide a "package" direction indicating device which is adapted for mounting as a unit on the rotatable portion of the vehicle steering wheel or parts mounted for rotation therewith.

A still further object is to provide a device of the stated character in which the indicia means is gravity oriented thereby eliminating the necessity of mounting portions of the structure on a non-rotatable base.

Still a further object is to provide an indicating device of the stated character which is adapted to be disposed bodily in a steering wheel horn ring cavity of the type normally occupied by the horn medallion or crest.

Yet another object is to provide a direction indicating device which is simple in construction, low in cost and efficient in operation.

These and other objects, advantages and features of the invention will become more fully apparent as reference is had to the accompanying specification and drawing wherein:

Fig. 1 is a side elevational view, partly in section, of a portion of a vehicle steering wheel assembly showing the form and arrangement of the invention with reference thereto, certain parts being broken away to more clearly illustrate the structure; and Fig. 2 is a fragmentary plan view looking in the direction of arrows 2—2 of Fig. 1, certain parts being broken away to more clearly reveal the structure.

Referring now to the drawing and particularly Fig. 1, reference numeral 2 designates generally the hub portion of a conventional steering wheel. A plurality of steering wheel spokes 4 extend radially from hub 2 to engage a steering wheel rim, not shown. Centrally thereof, hub 2 is provided with a splined axially directed opening 6 which is adapted for cooperating engagement with the splined upper end 8 of a steering shaft 10. Spaced immediately adjacent the lower edge of hub 2 is the usual steering column 12 which is disposed in concentric relation relative to shaft 10 and extends toward the vehicle body fire wall, not shown. At its upper extremity, shaft 10 is adapted for threaded engagement with a machine nut 14 which serves to secure the hub against endwise movement on the shaft.

Axially adjacent opening 6, hub 2 is formed with an enlarged circular cavity 16. Disposed in cavity 16 is a horn ring body 18. Body 18 comprises a central cylindrical portion 20 and a plurality of integral radially extending branch members 22 which generally overlie the steering wheel spokes 4 and terminate in an integral ring portion, not shown. Cylindrical body 20 is resiliently secured in hub 2 so as to be rotatable with the steering wheel but capable of yieldable axial and rocking movement from its normal position to energize the vehicle horn. Such mountings are well known in the prior art and extensively used in production vehicles. However, since the particular form or mode of attachment of the horn ring to the steering wheel forms no part of the present invention, no further description will be given, it being understood that any suitable means may be utilized.

In order to provide visual indication of the angular position of the steerable vehicle wheels in accordance with the present invention, there is provided an indicator mechanism 23 which is adapted to be press fitted or otherwise disposed in the cavity formed by the inner wall 24 of horn ring cylindrical portion 20. After disposition of mechanism 23 therein, a suitable transparent dome or cover 26 is secured over the upwardly facing open portion of the horn ring to protect the mechanism while affording unimpaired visibility thereof.

As seen in Fig. 1, the mechanism comprises a circular support 28. Support 28 is formed of a series of integral axially aligned stepped cylindrical portions of progressively reduced diameter. Base portion 29 of support 28 is adapted to be press fitted into the inner wall 24 of the horn ring. At its outer extremity, support 28 is provided with an integral pinion portion 30 which is axially aligned with the steering post 10. Axially inwardly adjacent pinion 30, support 28 is provided with a bearing portion 32, the diameter of which is slightly in excess of the major diameter 30. Rotatably disposed over bearing portion 32 is a generally circular dial face element 34. Element 34 includes a gear sector portion 36 and an indicia portion 38. As seen best in Fig. 2, the indicia portion is relatively thin and occupies the upper half of the circle defined by the horn ring cavity, while sector portion 36 occupies the lower portion of the cavity. In Fig. 1 it will be evident that the lower portion of dial face 34 is of considerably greater mass than the upper portion. Because of the difference in mass, dial face 34 functions as a pendulum which is effective to orient the dial face in the position shown in Fig. 2. Press fitted centrally in pinion portion 30 and extending axially outwardly therefrom is a relatively small diameter bearing pin 40 upon which is rotatably disposed an indicator arm structure 42 having at its upper end an indicia pointer 44. At its lower end, arm 42 carries an inwardly extending bearing pin 46 upon which is rotatably disposed an idler gear 48. Idler gear 48 is so formed as to provide simultaneous meshing engagement with sector gear 36 and pinion 30.

In the interest of economical fabrication, each of the parts just described, except pins 40 and 42, may be moulded or otherwise formed of suitable plastic materials, as for example, nylon and Lucite. When formed and arranged in the manner described, the mechanism 23 is operative upon rotation of the steering wheel to cause the pointer portion 44 of indicator 42 to assume an angle relative to indicia 38 of dial face 34 corresponding to the angular position of the steerable vehicle wheel relative to the longitudinal vehicle midline.

In order that the invention may be more fully understood, a description of the operation of the mechanism follows: Assume that the steering wheel is originally in a position causing the steerable wheels to point straight ahead. When the operator rotates the steering wheel, as for instance in a counterclockwise direction, the support 28 and pinion 30 are constrained to rotate therewith. However, counterclockwise rotation of pinion 30 imparts clockwise rotation to idler gear 48. Since idler gear 48 is also engaged by sector gear 36, any rotation of the former requires that it move bodily relative to the sector gear or vice-versa. Due to the pendulum action of dial face 34, resistance to bodily movement of sector 36 is greater than resistance to bodily movement of idler gear 48. Therefore, clockwise rotation of the idler gear causes the latter to move angularly in a counterclockwise direction relative to sector gear 36. Since bodily angular movement of the idler gear 48 in a counterclockwise direction causes similar counterclockwise movement of the indicator arm 42, the pointer 44 thereof moves to overlie indicia 50 corresponding with the relative angular position of the steerable wheels. It will, of course, be evident that the gear ratio provided by pinion 30, idler gear 48 and sector gear 36 must be properly selected to obtain exact correlation between the indicia 50 on the dial face and the angular position of the steerable wheels. This ratio will, of course, vary depending upon the steering gear reduction ratio employed.

From the foregoing it will be seen that a simplified and improved indicating mechanism has been provided. It should be particularly noted that the present invention requires virtually no mechanical integration with the steering mechanism proper. Thus, it is only necessary that a suitable recess be provided in the rotatable portion of the steering wheel in alignment with the axis of rotation theref. In this connection, it will be seen that the invention is particularly advantageous since it is susceptible to installation in vehicles without special steering mechanism construction or resorting to complicated and expensive alterations. By way of comparison, in devices of the type known heretofore, it has always been necessary to secure certain parts of the mechanism positively against rotation, whereas in the present invention, this requirement has been obviated by orienting the dial face by pendulum action.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:

1. In association with the steering wheel of an automotive vehicle having dirigible means angularly displaced incident to the steering action, a support rotating with said wheel, dial means carried on said support in non-fixed relation and having mass characteristics such that it does not rotate with said support, said dial means having gearing associated therewith, a drive gear fixed on said support, and an indicating device pivoted on said support in juxtaposition to said dial means, said device being connected to said drive gear via gearing means engaging also with the gearing associated with said dial means, said gearing means being carried by said device.

2. Within the hub of the steering wheel of an automotive vehicle having dirigible means angularly displaced incident to the steering action, a support rotating with said wheel, dial means carried on said support in non-fixed relation and having mass characteristics such that it does not rotate with said support, said dial means having a sector gear associated therewith, a pinion fixed on said support to rotate therewith, and an indicating device pivoted to said support and connected to said pinion via a gear rotatably carried by said indicating device, said last gear engaging said sector gear as well as said pinion.

3. Within the hub of the steering wheel of an automotive vehicle having dirigible means angularly displaced incident to the steering action, a body member rotating with said wheel, dial means carried on said body member in non-fixed relation and having mass characteristics such that it does not rotate with said body member, said dial means including sector gear teeth, a pinion fixed on said body member to rotate therewith, and an indicating device pivoted to said body member and carrying a spur gear meshing with said pinion and with said sector gear teeth, the point of pivotal support of said spur gear on said device being spaced radially from the point of support of said device on said body member.

4. Within the hub of the steering wheel of an automotive vehicle having dirigible means angularly displaced incident to the steering action, an annular stepped body member co-axial with said wheel and fitted into said hub to rotate therewith, dial means carried on said body member in non-fixed relation and having mass characteristics such that it does not rotate with said body member, one of the steps of said body member providing the bearing for said dial means, the latter having sector gear teeth associated therewith, a pinion fixed on a step portion of said body member outward of said dial means, and an indicating device pivoted to said body member to overlie said dial means, said indicating device rotatably supporting a spur gear meshing both with said pinion and said sector gear teeth, the point of rotatable support of said spur gear on said device being radially spaced from the point of pivotal support of said device on said body member.

References Cited in the file of this patent

UNITED STATES PATENTS

| | | |
|---|---|---|
| 2,104,521 | Jackson | Jan. 4, 1938 |
| 2,147,598 | Becker | Feb. 14, 1939 |
| 2,282,189 | Jackson | May 5, 1942 |